United States Patent
Bright

(10) Patent No.: US 8,063,526 B2
(45) Date of Patent: Nov. 22, 2011

(54) MAGNETIC GEARBOX ARRANGEMENT

(75) Inventor: Christopher G. Bright, Nottingham (GB)

(73) Assignee: Rolls-Royce PLC., London (GB)

( * ) Notice: Subject to any disclaimer, the term of this patent is extended or adjusted under 35 U.S.C. 154(b) by 362 days.

(21) Appl. No.: 12/223,264

(22) PCT Filed: Feb. 19, 2007

(86) PCT No.: PCT/GB2007/000545
§ 371 (c)(1),
(2), (4) Date: Aug. 5, 2008

(87) PCT Pub. No.: WO2007/107691
PCT Pub. Date: Sep. 27, 2007

(65) Prior Publication Data
US 2010/0090552 A1    Apr. 15, 2010

(30) Foreign Application Priority Data
Mar. 17, 2006   (GB) .................................. 0605356.5

(51) Int. Cl.
*H02K 1/22* (2006.01)
(52) U.S. Cl. ........................................ 310/103; 310/105
(58) Field of Classification Search ................. 310/266, 310/112–114, 103, 105
See application file for complete search history.

(56) References Cited

U.S. PATENT DOCUMENTS

| | | | | | |
|---|---|---|---|---|---|
| 3,546,548 | A | * | 12/1970 | Wouk | 318/139 |
| 5,633,555 | A | * | 5/1997 | Ackermann et al. | 310/75 D |
| 5,675,203 | A | | 10/1997 | Schulze et al. | |
| 5,744,895 | A | * | 4/1998 | Seguchi et al. | 310/266 |
| 5,994,809 | A | | 11/1999 | Ackermann | |
| 6,217,298 | B1 | * | 4/2001 | Klaui | 417/420 |
| 6,297,575 | B1 | * | 10/2001 | Yang | 310/266 |
| 6,903,471 | B2 | * | 6/2005 | Arimitsu et al. | 310/59 |
| 7,781,930 | B2 | * | 8/2010 | Abe et al. | 310/103 |

FOREIGN PATENT DOCUMENTS

| | | |
|---|---|---|
| EP | 0 798 844 A1 | 10/1997 |
| EP | 1 353 436 A2 | 10/2003 |
| RU | 2 088 033 C1 | 8/1997 |

* cited by examiner

*Primary Examiner* — Dang D Le
(74) *Attorney, Agent, or Firm* — Oliff & Berridge, PLC

(57) ABSTRACT

Magnetic gearboxes an inner rotor and an outer rotor are known with pole members between them. However, these gearbox arrangements generally have a fixed gear ratio between the rotors. By provision of pole members with coils between them and associated switches to adjust the magnetic flux modulation capacity between the rotors it is possible to create open circuit, closed circuit and variable impedance configurations which will relatively passively adjust the magnetic flux modulation capacity or by presenting a voltage to the coils or drawing a voltage from the coils to more actively adjust the magnetic flux modulation capacity across the arrangement. In such circumstances a wider range of gear ratios is achieved as well as the capability with regard to localized electrical power generation through the gearbox arrangement or electro magnetic braking achieved upon the gear box as required.

13 Claims, 2 Drawing Sheets

Prior Art
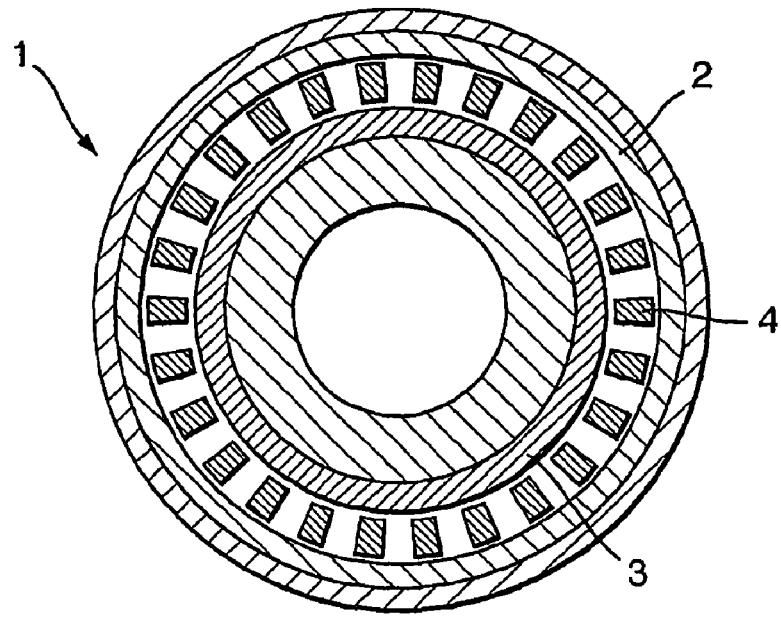
Fig.1.
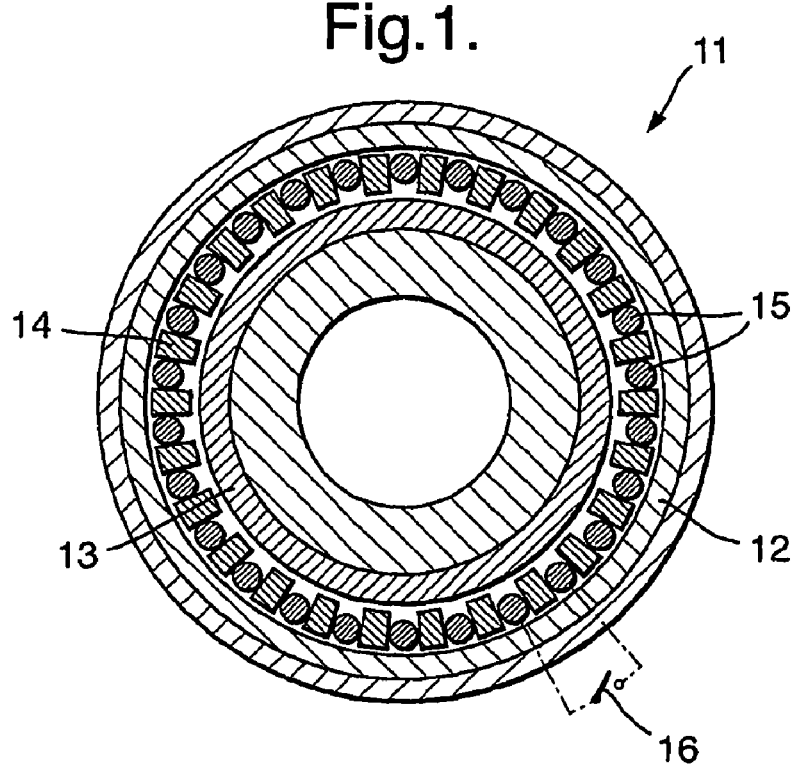

MAGNETIC GEARBOX ARRANGEMENT

The present invention relates to gearboxes and more particularly a magnetic gearbox arrangement having a variable gear ratio.

Provision of gearboxes is a well known requirement for providing mechanical drive transfer between a drive mechanism and a driven mechanism. Traditionally, gearboxes have been formed from gear wheels having appropriate teeth numbers and sizes to provide a desired gear ratio. It is also known to provide magnetic gearboxes as shown in the example gearbox arrangement 1 depicted in the attached figure marked as Prior Art.

In the arrangement 1 an outer rotor 2 is positioned about an inner rotor 3 with magnetic pole members 4 between them. Turning one rotor causes the other rotor to rotate in the reverse direction. The pole members 4 are generally stationary and made of laminated ferromagnetic material. These pole members modulate the magnetic field produced by each rotor so that the polarity of the modulation product matches the polarity of the field of the other rotor.

Alternatively, the pole members may also be mounted on a rotor, a so called middle rotor. Thus, if the inner rotor is fixed or stationary then the middle rotor will rotate in response to the rotation of the outer rotor. If the outer rotor is fixed or stationary then the middle rotor will rotate in response to the rotation of the inner rotor. The magnetic gearbox behaves as a "Sun and Planet" gearbox with the inner rotor acting as the sun, the stationary pole members as the planets and the outer rotor acting as the ring.

In a further alternative the outer or inner rotor may be replaced by an electric machine (poly-phase or otherwise) so that the magnetic gearbox may act as a generator if mechanical drive is applied to a rotor, or act as a motor if electrical power is supplied to the windings.

The prior magnetic gearbox arrangements described above are limited by the effective fix gear ratio between the rotors due to the pole members, whether fixed or rotating. As indicated the pole members provide modulation of the magnetic flux between the rotors and so with these previous arrangements it is necessary to dismantle the arrangement to change the pole members to change the gear ratio.

In accordance with aspects of the present invention there is provided a magnetic gearbox comprising an inner rotor and an outer rotor with a plurality of pole members in between, at least one pole member comprising a coil and a switch to control the coil to alter the magnetic flux of that pole member and so adjust a gear ratio between the inner rotor and the outer rotor when turned.

Typically, the pole members are stationary.

Generally, the inner rotor and/or the outer rotor have respective mechanical couplings. Typically, the mechanical couplings are to connect a drive mechanism and a driven mechanism. Advantageously, the mechanical couplings provide an electrical machine to generate electrical power and/or provide drive.

Generally, the switch is between an open circuit and a short circuit configuration for the respective coil. Alternatively, the switch is to provide a variable impedance across the coil. Potentially, the variable impedance acts to provide a load for braking effect upon the inner rotor and/or the outer rotor.

Possibly, the coil is coupled to a voltage supply for a rotating magnetic field.

Potentially, the coils can generate electrical power by mechanically driven rotation of the inner rotor and/or the outer rotor.

Embodiments of the present invention will now be described by way of example only and with reference to the accompanying drawings in which:—

FIG. 1 is a schematic cross section of a gearbox arrangement in accordance with a first embodiment of aspects of the present invention;

Figure 2:
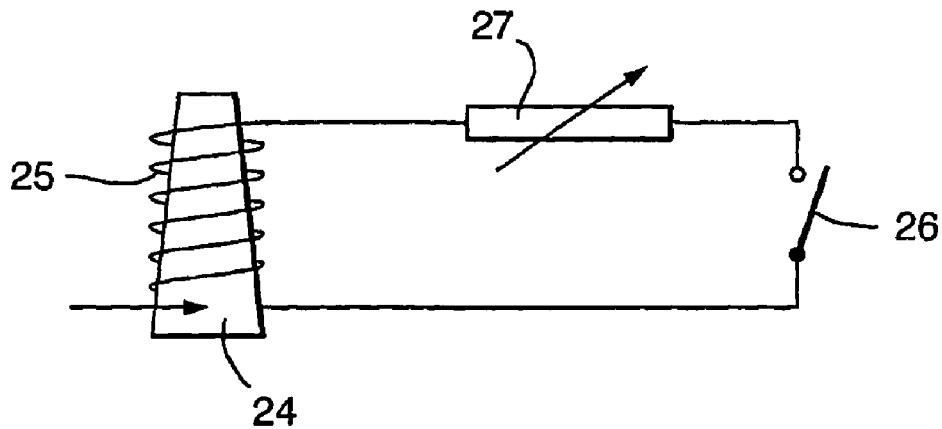
FIG. 2 is a schematic illustration of a first pole member and switch in accordance with aspects of the present invention.

As indicated above provision of a magnetic gearbox with a variable gear ratio would be advantageous. The pole members provide modulation between of the magnetic flux between permanent magnets associated with an inner rotor and with an outer rotor. Thus, aspects of the present invention provide for alteration of the magnetic flux transfer effects of the pole members.

FIG. 1 provides a schematic illustration of a gearbox arrangement 11 in accordance with aspects of the present invention. Thus, the arrangement 11 has an inner rotor 13 and an outer rotor 12 with pole members 14 between them. The pole members 14 are generally stationary and are mounted on a stator or alternatively the pole members 14 are mounted on a further rotor for rotation. These pole members 14 have electrical coils 15 or windings about them. Furthermore, as shown by broken line 16 as an example each coil 15 has a switch 16 which can at least provide an open circuit or closed circuit configuration for the coil 15. In such circumstances, dependent upon the state of the switch 16 there is a variation on the magnetic flux transfer, or generation, capabilities of the associated coil 15. If the switch is closed, the short-circuited coil reduces the magnetic flux in the associated pole member 14. This reduction effectively removes the modulation effect of the pole member 14 affecting modulation of the magnetic fields between the rotors 12, 13, that is to say the permanent magnet rotors through the ferromagnetic pole elements associated with each rotor 12, 13. The effective gear ratio is therefore changed due to changes in the level of magnetic flux modulation.

It will be understood that in the basic or first open/closed circuit embodiment aspects of the present invention that in the open circuit, that is to say when the switch is opened across the coil 15, the magnetic flux transfer capacity of the pole members 14 and so the arrangement 11 is much greater and so a different level of magnetic modulation between the rotors 12, 13 will be achieved, resulting in a different effective gear ratio to when the circuit in the coil 15 is closed.

The basic open/closed circuit embodiment aspects of the present invention described above can be configured in a number of ways but will generally require balance across the arrangement 11. Thus, all the switches 16 may be consolidated so that all of the coils 15 are either on or off giving two effective gear ratios, one when the coils 15 are on that is to say closed, and one when the coils 15 are off that is to say open. Alternatively, individual or groups of switches may be grouped for selective operation. Thus, the magnetic field between the rotors 12, 13 may be variably modulated by selective switching of the open or closed circuit status of the coils 15 in order to achieve different effective gear ratios between the rotors 12, 13.

It will be understood that in one embodiment of the present invention the pole members 14 and the coils 15 are stationary. However, where feasible with an appropriate slip switching mechanism it may be possible to provide as also described above an arrangement were the pole members and coils are also allowed to rotate to give a Sun and Planets type gearbox arrangement.

As indicated above, simple switching of the coils 15 into and out of a closed circuit configuration will alter the magnetic flux modulation effects of the pole members 14 and therefore the effective gear ratio to the arrangement 11. However, greater variability may also be achieved by arranging for the switch to connect an impedance rather than achieve short circuit and open circuit configurations. This impedance may be varied in order to control the gear ratio of the arrangement and therefore provide effective gear ratios over a range from effective open circuit to effective closed circuit or other range. Alternatively, the impedance may be fixed so that the switch provides three configurations, open, impedance load and closed. In such circumstances the switch may be any device capable of switching for example a relay or a semi conducting device.

FIG. 2 is a schematic illustration of one coil 25 and one pole member 24 associated with a switch 26 and a variable impedance 27. This arrangement will be replicated in an arrangement similar to that depicted in FIG. 1 for each pole member 14 and coil 15 in arrangement 11. In the second embodiment depicted in FIG. 2 as can be seen a switch 26 acts as a master such that the coil 25 can be arranged in an effective open circuit and closed circuit configuration. These open circuit and closed circuit configurations effectively define the extent of the range of gear ratios possible. However, in accordance with a second embodiment depicted in FIG. 2 the variable impedance 27 can alter the impedance of the whole circuit 25. In such circumstances in the closed configuration the impedance 27 can be adjusted in order to vary the magnetic flux modulation capabilities of the respective pole member 24 and therefore in the configuration described above with regard to FIG. 2 the modulation effects between the inner rotor 11 and the outer rotor 12. In such circumstances dependent upon the impedance value provided by the variable impedance 27 the gear ratio between the rotors 12, 13 can be adjusted and varied as required.

It will be understood that the above first and second embodiments of aspects of the present invention are essentially relatively passive in terms of the circuits created by the pole members 14, 24 and coils 15, 25 with the operational switches 16, 26. These embodiments are passive in the sense that no electrical current is presented through the coils specifically for gearbox arrangement control. However, it will be appreciated that coils may be provided with terminals so that voltages may be applied to the coils on the pole members to control the gearbox arrangement and also therefore alter the speed of the inner and outer rotors. It will be understood that alternating current, direct current or a combination of alternating and direct current voltages may be used.

Figure 4:
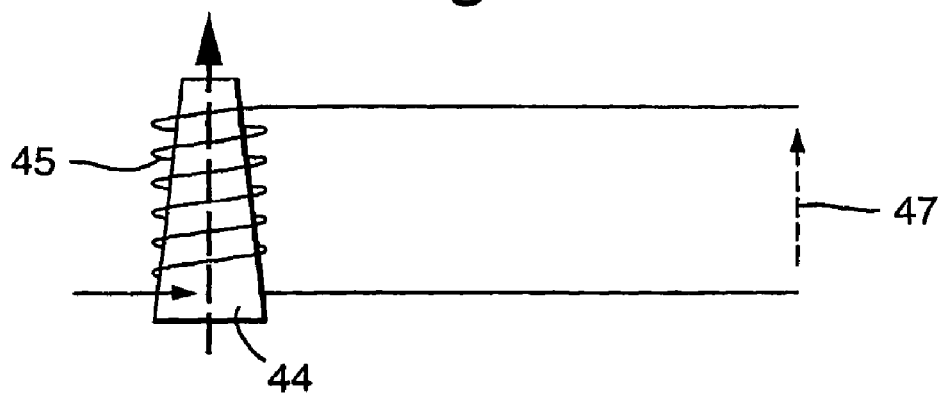

FIG. 4 provides a schematic illustration of an arrangement where a voltage 37 is presented across the coil 35. In such circumstances this voltage 37 will generate through the electrical current flow through the coil 35 its own magnetic flux in the respective pole member 34 and therefore adjust the magnetic flux modulation in between inner and outer rotors of a gearbox arrangement as described above.

It will be understood that the coils 35, pole members 34 and applied voltages 37 will generally be presented in an arrangement in a similar fashion to that described with regard to FIG. 2. In such circumstances typically the coils 35 will be stationary pole members that can be wound as a three phase winding so that the stationary pole members behave as a stator of a three phase electrical machine. A three phase voltage supply would then be presented to produce a rotating magnetic field so changing the relative speeds of rotation of the inner and outer rotors in a gearbox arrangement in accordance with aspects of the present invention. The speeds can be controlled by variable voltage variable frequency inverters using methods commonly utilised with respect to variable speed motor drives. In such circumstances a number of electrical phases may be used in order to create the necessary rotating magnetic fields for speed variation between the inner and outer rotors.

It will be understood by supplying electrical power in the form of the voltage 37 across the coil 35 with an electrical current passing through the coil that this supply of electrical power to the winding on a pole member offers a mechanism for injecting power into a gearbox arrangement, either to reduce the mechanical input power required, or increase the mechanical output power or a combination of the two. In such circumstances the gearbox will be active in the sense that in addition to providing rotational speed adjustment across the gearbox arrangement that the gearbox may add to the torque capacity of the power train created by the gearbox arrangement by itself adding or decreasing the capability of the power train overall.

A further fourth embodiment of aspects of the present invention is depicted in FIG. 4 where the present gearbox arrangement may be used in a regenerative capacity or otherwise in order to generate electrical power. This fourth embodiment is in part similar to that of the third embodiment except that, rather than an applied voltage presented across the coil 35 in FIG. 3, mechanical rotation generates electrical power in the coil which is then appropriately tapped for usage. Thus, as depicted in FIG. 4 a pole member 44 is associated with a coil 45. The pole members 44 and coils 45 are secured in an arrangement similar to that depicted in FIG. 2. In such circumstances, if one or both rotors are turned by a mechanical force through magnetic flux modulation an electrical current is generated in the coil 45 which presents itself as a generated voltage 47 across each coil 45 of the gearbox arrangement. Thus, where appropriate, electrical power can be taken from the power train as required for local usage. The pole members each carry a coil 47 which, through changing magnetic fields on the pole member, generates the induced voltage 47 in the coils 45 within the windings.

Figure 3:
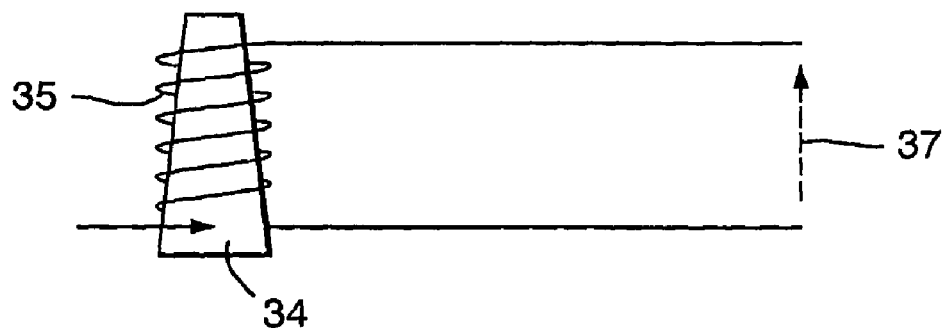
FIG. 3 is a schematic cross section of a coil and switch in accordance with a second embodiment of aspects of the present invention; and, FIG. 4 is a schematic illustration of a coil and switch in accordance with a third embodiment of aspects of the present invention.

It will be understood that the third and fourth embodiments respectively depicted in FIGS. 3 and 4 can be co-operative as required. In such circumstances by appropriate switching control the arrangements and embodiments depicted in FIGS. 3 and 4 can be used within vehicles or vessels as a source of electrical power replacing additional generators and so achieving a weight and space saving.

The present invention particularly provides, as indicated, variation in the magnetic flux modulation across the rotors of gearbox arrangements in order to vary the gear ratio between those rotors. In such circumstances the rotors will be associated with suitable magnetic couplings in order to act as a gearbox arrangement. It will be understood that a normal gearbox arrangement provides a stepping up or stepping down in the rotational speeds between two mechanical drive mechanisms. By the present invention variation in the gear ratio, and therefore the capabilities of a gear arrangement in accordance with aspects of the present invention can be adjusted through altering the impedance at least between an open circuit and a closed circuit configuration but advantageously by allowing variation in the impedance over that range. It will also be understood that active introduction of electrical power across the coil or removal of that electrical power can be utilised in order to further improve the torque transfer capacity of the gearbox arrangement or to act as a brake upon the power transfer. It will be understood that if electrical power is taken from the coils as depicted in the fourth embodiment of aspects of the present invention described above, then the gearbox arrangement will provide a brake upon power transfer.

It will be understood that the actual gear ratio range achieved by a gearbox arrangement in accordance with aspects of the present arrangement will depend upon the particular coil configurations, pole member sizes and rotors, but nevertheless there will at least be a gearbox gear ratio range provided between a short circuit for one or more of the coils in the arrangement to alter the magnetic flux modulation capacity of the gearbox arrangement and therefore the gear ratio between the rotors. By changing the gear ratio by applying voltages to one or more coils, for example if the coils are wound as a three phase winding, a three phase voltage applied to the winding will create a rotating magnetic field which itself will change the relative speeds of the inner and outer rotors and therefore the effective gear ratio of the gear box arrangement. It will be understood by removing generated electrical power from the coils of the pole members local electrical power generation can be provided where necessary. This electrical power generation will also act as electro magnetic braking upon the gearbox arrangement which can be further utilised within the machinery incorporating the gear box arrangement in accordance with aspects of the present invention. The impedances connected to the coils will also dissipate power again producing electro magnetic braking for the gearbox arrangement.

Although described with regard to a simple inner and outer rotor configuration with pole members and coils therebetween, it will also be understood that a multi stage gearbox arrangement can be provided with several sets of concentric rotors with respective pole members and coils between them in order to create a cascade gear ratio between the rotors as required.

The present invention may be utilised in any situation where a power train gear box is required.

It will be understood that the specific permanent magnets in the rotors as well as the coil configurations and pole member shapes and settings along with numbers will be chosen in accordance with requirements both in terms of capacity as well as smoothness of operation.

The invention claimed is:

1. A magnetic gearbox, comprising:
    an inner rotor;
    an outer rotor; and
    a plurality of pole members disposed between the inner rotor and the outer rotor,
    wherein at least one pole member includes a coil and a switch to control the coil to alter the magnetic flux of the at least one pole member and to adjust a gear ratio between the inner rotor and the outer rotor when turned, and
    the at least one pole member modulates a magnetic field produced by each of the inner rotor and the outer rotor so that a polarity of a modulation product matches a polarity of the magnetic field of an other one of the inner rotor and the outer rotor.

2. A gearbox as claimed in claim 1, wherein at least one of the inner rotor and the outer rotor have respective mechanical couplings.

3. A gearbox as claimed in claim 2, wherein the mechanical couplings are to connect a drive mechanism and a driven mechanism.

4. A gearbox as claimed in claim 2, wherein the mechanical couplings provide an electrical machine to at least one of generate electrical power and provide drive power.

5. A gearbox as claimed in claim 1, wherein the switch is between an open circuit configuration and a short circuit configuration for the coil.

6. A gearbox as claimed in claim 1, wherein the switch is to provide a variable impedance across the coil.

7. A gearbox as claimed in claim 6, wherein the variable impedance acts to provide a load for braking effect upon at least one of the inner rotor and the outer rotor.

8. A gearbox as claimed in claim 1, wherein the coil is coupled to a voltage supply for a rotating magnetic field.

9. A gearbox as claimed in claim 1, wherein the coil generates electrical power by mechanically driven rotation of at least one of the inner rotor and the outer rotor.

10. A gearbox as claimed in claim 1, wherein the inner rotor or the outer rotor is stationary.

11. A gearbox as claimed in claim 1, wherein the outer rotor is stationary.

12. A gearbox as claimed in claim 1, wherein the inner rotor is stationary.

13. A gearbox as claimed in claim 1, wherein the plurality of pole members are stationary.

\* \* \* \* \*